United States Patent
Yoshizaki et al.

(10) Patent No.: US 11,203,673 B2
(45) Date of Patent: Dec. 21, 2021

(54) THERMOPLASTIC COMPOSITE MATERIAL AND FORMED BODY

(71) Applicant: FURUKAWA ELECTRIC CO., LTD., Tokyo (JP)

(72) Inventors: Motoko Yoshizaki, Tokyo (JP); Makiko Nakano, Tokyo (JP); Takayori Ito, Tokyo (JP); Yukihiro Ikura, Tokyo (JP); Takahiro Iida, Tokyo (JP); Yasumasa Morishima, Tokyo (JP); Hidekazu Hara, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 15/971,718

(22) Filed: May 4, 2018

(65) Prior Publication Data

US 2018/0251610 A1    Sep. 6, 2018

Related U.S. Application Data

(63) Continuation of application No. PCT/JP2016/082882, filed on Nov. 4, 2016.

(30) Foreign Application Priority Data

Nov. 6, 2015  (JP) .............................. JP2015-218618

(51) Int. Cl.
| | | |
|---|---|---|
| *C08J 5/04* | (2006.01) | |
| *B29C 70/20* | (2006.01) | |
| *B29C 43/02* | (2006.01) | |
| *B29C 70/30* | (2006.01) | |
| B29B 15/12 | (2006.01) | |
| B29K 23/00 | (2006.01) | |
| B29K 105/08 | (2006.01) | |
| B29K 307/04 | (2006.01) | |

(52) U.S. Cl.
CPC .............. *C08J 5/042* (2013.01); *B29C 43/02* (2013.01); *B29C 70/20* (2013.01); *B29C 70/30* (2013.01); *C08J 5/04* (2013.01); B29B 15/125 (2013.01); B29K 2023/12 (2013.01); B29K 2105/0881 (2013.01); B29K 2307/04 (2013.01); C08J 2351/06 (2013.01)

(58) Field of Classification Search
CPC ......... B29C 70/30; B29C 43/02; B29C 70/20; C08J 5/04; C08J 5/042
See application file for complete search history.

(56) References Cited

U.S. PATENT DOCUMENTS

| | | | |
|---|---|---|---|
| 6,054,177 | A | 4/2000 | Endoh et al. |
| 2004/0170554 | A1 | 9/2004 | Wadahara et al. |
| 2005/0223947 | A1 | 10/2005 | Huang |
| 2008/0193757 | A1 | 8/2008 | Barnaud et al. |
| 2012/0015186 | A1 | 1/2012 | Honma et al. |
| 2014/0356612 | A1 | 12/2014 | Sano et al. |
| 2015/0225517 | A1 | 8/2015 | Ohtani et al. |

FOREIGN PATENT DOCUMENTS

| | | |
|---|---|---|
| CN | 1961046 A | 5/2007 |
| CN | 101171114 A | 4/2008 |
| JP | 8-323748 A | 12/1996 |
| JP | 2005-187737 A | 7/2005 |
| JP | 2006-233346 A | 9/2006 |
| JP | 3894035 B2 | 3/2007 |
| JP | 2008-44999 A | 2/2008 |
| JP | 2010-149353 A | 7/2010 |
| JP | 2013-189634 A | 9/2013 |
| JP | 2013-203941 A | 10/2013 |
| WO | WO 2013/108811 A1 | 7/2013 |
| WO | WO 2014/038574 A1 | 3/2014 |
| WO | WO 2016/114352 A1 | 7/2016 |

OTHER PUBLICATIONS

Extended European Search Report, dated Jun. 13, 2019, for European Application No. 16862226.4.
International Search Report (PCT/ISA/210) issued in PCT/JP2016/082882, dated Dec. 13, 2016.
Chinese Office Action and Search Report, dated Nov. 5, 2019, for Chinese Application No. 201680061868.X, with an English translation.
Chinese Office Action and Search Report dated Jun. 15, 2020 for corresponding Application No. 201680061868.X, along with an English translation of the Office Action.

*Primary Examiner* — Peter D. Mulcahy
(74) *Attorney, Agent, or Firm* — Birch, Stewart, Kolasch & Birch, LLP

(57) ABSTRACT

A thermoplastic composite material comprising, a fiber bundle having a polypropylene emulsion impregnated therein and having a plurality of reinforcing fibers lined up in a predetermined direction, and satisfies the following conditions (1) to (4); and a formed body:

(1) A void content of the thermoplastic composite material is 3% or less, (2) A fiber volume fraction of the thermoplastic composite material is 40% or more and 70% or less, (3) A bending strength of a laminated body, in which a plurality of layers of the thermoplastic composite material has been laminated so that the reinforcing fibers would be lined up in one direction, when bent in the fiber-axis direction and measured in conformity to JIS K7074, is 250 MPa or more, and a bending elastic modulus of the laminated body is 90 GPa or more, and (4) A variation coefficient of the bending strength, when measured at N=5 or more and calculated in conformity to JIS K7074, is within 7%.

13 Claims, 1 Drawing Sheet

THERMOPLASTIC COMPOSITE MATERIAL AND FORMED BODY

CROSS-REFERENCE TO RELATED APPLICATIONS

This application is a Continuation of PCT International Application No. PCT/JP2016/082882 filed on Nov. 4, 2016, which claims priority under 35 U.S.C. § 119 (a) to Japanese Patent Application No. 2015-218618 filed in Japan on Nov. 6, 2015. Each of the above applications is hereby expressly incorporated by reference, in its entirety, into the present application.

TECHNICAL FIELD

The present invention relates to a thermoplastic composite material and, in more particular, relates to a fiber-reinforced thermoplastic composite material composed of a continuous reinforcing fiber and a thermoplastic resin. Further, the present invention relates to a formed body composed of the above-described fiber-reinforced thermoplastic composite material and, in more particular, relates to an automobile member, a structural member, a reinforcing member, and the like.

BACKGROUND ART

Recently, fiber-reinforced thermoplastic composite materials that are lighter in weight than metals such as iron and aluminum and that have high specific strength and high specific stiffness, have been put to practical use for purposes such as an aerospace field, automobiles, sporting goods, and personal computer housings.

However, under the conventional technology, thermosetting prepregs having thermosetting resins impregnated in carbon fibers, as described in Patent Literature 1, were the main stream. The thermosetting prepregs had a problem with a shelf-life of the thermosetting resin, a problem that a storage condition control is needed, and a problem that longer periods of time for forming are needed to complete a curing reaction of the thermosetting resin.

For shortening of the forming time and improvement in the shelf-life of the fiber-reinforced composite materials including prepregs, fiber-reinforced composite materials using thermoplastic resins have begun to attract attention. The fiber-reinforced composite materials using thermoplastic resins are also excellent in recycling efficiency in addition to the advantage of the shortening of the forming time. However, in fiber-reinforced composite materials using thermoplastic resins, high-viscosity resins are necessarily impregnated between reinforcing fibers. But, it is very difficult to impregnate the resins at full into the interior of the reinforcing fiber bundles. Accordingly, it is hard to obtain formed bodies combining high strength and high uniformity in strength.

As to methods of producing the fiber-reinforced thermoplastic composite materials, from the past, there have been known, for example, a method of impregnating a resin in the form of a film to a reinforcing fiber material by heat-melting (melting and impregnation method) as described in Patent Literature 2, a method of coating and fusing a powdered resin on a reinforcing fiber material by a fluid bed method or a suspension method (powder method) as described in Patent Literature 3, and the like.

Further, efforts for improving an impregnation rate of the resin to the fiber-reinforced thermoplastic composite material have been made. For example, Patent Literature 4 proposes a method of obtaining a composite material composed of a thermoplastic resin and a carbon fiber, which includes the following processes of: dispersing a thermoplastic resin such as a polyimide resin having a particle size of about 10 μm in a mixed solvent of alcohols, or in an organic solvent such as acetone, to form a suspension liquid; soaking a carbon fiber bundle in the suspension liquid, to attach the resin powder to the carbon fiber bundle; and then heating and drying it by bringing it in contact with a heated roller until the solvent is reduced to a predetermined amount; and then fusing the resin powder.

On the other hand, in order to increase an impregnation performance to the space between carbon fibers, Patent Literature 5 proposes a method of impregnating, to the space between carbon fibers, a polyamide-series resin having a very high melt flow rate (MFR) and having no aromatic group, in the form of an emulsion in which the polyamide-series resin has been dispersed in water.

Further, Patent Literature 6 describes a technology focused on the fact that a polypropylene resin is poor in the interface adhesion strength to the reinforcing fiber, so that it is particularly hard to obtain a formed article which is excellent in mechanical characteristic. This technology proposes a sizing treatment of the carbon fiber and advancement of strength by the use of a carbodiimide-modified polyolefin.

CITATION LIST

Patent Literatures

Patent Literature 1: Japanese Patent No. 3894035
Patent Literature 2: JP-A-2013-203941 ("JP-A" means unexamined published Japanese patent application)
Patent Literature 3: JP-A-8-323748
Patent Literature 4: JP-A-2008-44999
Patent Literature 5: JP-A-2013-189634
Patent Literature 6: WO2013-108811

SUMMARY OF INVENTION

Technical Problem

Polypropylenes are industrially highly demand; and polypropylenes are majorly adopted in the automobile members including an automobile bumper, since polypropylene resins themselves have low density and are lightweight. Accordingly development of thermoplastic composite materials using polypropylenes as a base thereof has been desired.

In view of such situation, the present invention is contemplated to provide a thermoplastic composite material combining high strength and excellent uniformity in strength, and its formed body.

Solution to Problem

The present inventors have repeated to conduct intensive studies in order to solve the above problem. As a result, the present inventors have found that, by impregnating an emulsified polypropylene into a fiber bundle, a void content can be decreased and at the same time, a fiber volume fraction of the polypropylene composite material can be controlled to a particular range, thereby enabling provision of a thermoplastic composite material that is excellent in a bending strength and a bending elastic module as well as a uniformity in strength. The present invention has been completed by these findings.

The above-described problems of the present invention can be solved by the following means.

[1] A thermoplastic composite material comprising, a fiber bundle having a polypropylene emulsion impregnated therein and having a plurality of reinforcing fibers lined up in a predetermined direction,
wherein the thermoplastic composite material satisfies the following conditions (1) to (4):
(1) A void content of the thermoplastic composite material is 3% or less,
(2) A fiber volume fraction of the thermoplastic composite material is 40% or more and 70% or less,
(3) A bending strength of a laminated body, in which a plurality of layers of the thermoplastic composite material has been laminated so that the reinforcing fibers would be lined up in one direction, when bent in the fiber-axis direction and measured in conformity to JIS K7074, is 250 MPa or more, and a bending elastic modulus of the laminated body is 90 GPa or more, and
(4) A variation coefficient of the bending strength, when measured at N=5 or more and calculated in conformity to JIS K7074, is within 7%.
[2] The thermoplastic composite material as described in the item [1], wherein the reinforcing fiber comprises a carbon fiber.
[3] The thermoplastic composite material as described in the item [1] or [2], wherein the polypropylene is graft-modified.
[4] The thermoplastic composite material as described in any one of the items [1] to [3], wherein the thermoplastic composite material comprises at least one or more selected from the group consisting of Na, K, ammonia, and an organic amine compound.
[5] The thermoplastic composite material as described in any one of the items [1] to [4], wherein the thermoplastic composite material does not contain any surfactant.
[6] A formed body of the thermoplastic composite material as described in any one of the items [1] to [5].
[7] A thermoplastic composite material comprising a fiber bundle having a plurality of reinforcing fibers lined up in a predetermined direction, and polypropylene,
wherein the thermoplastic composite material satisfies the following conditions (1) to (5):
(1) A void content of the thermoplastic composite material is 3% or less,
(2) A fiber volume fraction of the thermoplastic composite material is 40% or more and 70% or less,
(3) A bending strength of a laminated body, in which a plurality of layers of the thermoplastic composite material has been laminated so that the reinforcing fibers would be lined up in one direction, when bent in the fiber-axis direction and measured in conformity to JIS K7074, is 250 MPa or more, and a bending elastic module of the laminated body is 90 GPa or more,
(4) A variation coefficient of the bending strength, when measured at N=5 or more and calculated in conformity to JIS K7074, is within 7%, and
(5) The thermoplastic composite material further comprises at least one or more selected from the group consisting of Na, K, ammonia, and an organic amine compound.
[8] The thermoplastic composite material as described in the item [7], wherein the reinforcing fiber comprises a carbon fiber.
[9] A formed body of the thermoplastic composite material as described in the item [7] or [8].

Advantageous Effects of Invention

According to the present invention, a thermoplastic composite material combining high strength and high uniformity in strength can be provided by efficiently impregnating a thermoplastic resin between reinforcing fibers, particularly into an interior of the fiber bundle. This results in deduction of the total cost including not only production cost, but also maintenance and sustainment of the work environment.

Other and further features and advantages of the invention will appear more fully from the following description, appropriately referring to the accompanying drawings.

BRIEF DESCRIPTION OF THE DRAWINGS

FIG. 1 is an enlarged diagrammatic perspective view showing a structure according to one embodiment of the thermoplastic composite material of the present invention.

MODE FOR CARRYING OUT THE INVENTION

Hereinafter, embodiments of the thermoplastic composite material of the present invention which are excellent in strength, particularly in a bending strength, and excellent in a bending elastic modulus and a uniformity in strength are described in detail. Hereinafter, the present invention is described step by step.
[Thermoplastic Composite Material]

The thermoplastic composite material of the present invention is a thermoplastic composite material composed of a fiber bundle in which a plurality of reinforcing fibers has been lined up in a predetermined direction, and a thermoplastic resin.

One preferable embodiment of the thermoplastic composite material of the present invention is a thermoplastic composite material composed of a fiber bundle in which a polypropylene emulsion has been impregnated therein, and in which a plurality of reinforcing fibers has been lined up in a predetermined direction. Another preferable embodiment of the thermoplastic composite material of the present invention is a thermoplastic composite material composed of a fiber bundle in which a plurality of reinforcing fibers has been lined up in a predetermined direction, and polypropylene. This thermoplastic composite material composed of a fiber bundle and polypropylene is a thermoplastic composite material containing polypropylene derived from a polypropylene emulsion.

FIG. 1 is an enlarged diagrammatic perspective view showing a structure according to one embodiment of the thermoplastic composite material of the present invention.

As shown in FIG. 1, the thermoplastic composite material 1 of the present invention contains a fiber bundle 2 in which a plurality of reinforcing fibers 2A has been lined up in a predetermined direction, and a polypropylene component 3 derived from a polypropylene emulsion.

Hereinafter, a constitution of the thermoplastic composite material (sometimes may be also referred to simply as "the composite material") is described.
(Fiber Bundle)

The fiber bundle used in the present invention is a fiber bundle in which a plurality of reinforcing fibers has been lined up in a predetermined direction (preferably one direction).

The fiber bundle-constituting reinforcing fiber is not particularly limited, but includes an inorganic fiber, an organic fiber, a metal fiber, or a fiber material composed of a mixture of these fibers. Specifically, the inorganic fiber includes a carbon fiber, a graphite fiber, a silicon carbide fiber, an alumina fiber, a tungsten carbide fiber, a boron fiber, a glass fiber, and a basalt fiber. The organic fiber includes an aramid fiber, a high-density polyethylene fiber, a polyamide fiber, and a polyester fiber. Among these, a carbon fiber is preferred because the carbon fiber is very excellent in both strength and elastic modulus. Examples of the carbon fiber include a PAN (polyacrylonitrile)-series carbon fiber and a pitch-series carbon fiber.

From the viewpoint of the filament number, the fiber bundle is classified into large tow and regular tow or the like. The regular tow is characterized by its filament number that is 24,000 or less, while the filament number of the large tow is 40,000 or more. Due to these characteristics, the regular tow is used in the aerospace field or for sport goods because of high mechanical performance, while the large tow is used for industrial materials because of a low cost.

As for the fiber bundle, from the viewpoint of a balance between cost or productivity and strength or elastic modulus, it is preferable to use a large tow of the PAN-series carbon fiber.

As for the fiber size of the fiber bundle-constituting reinforcing fiber, in general, those having a fiber size of 4 to 8 μm are commercially available. Especially, those having a fiber size of 5 to 7 μm are preferred.

As one of factors which decrease the strength of the carbon fiber, a structural defect of the fiber itself is exemplified. Since the finer fiber is less likely to cause a defect, the use of a carbon fiber having a fine fiber size allows improvement in the strength of the composite material and its formed body, so that it is preferable to use such carbon fiber.

Note that, in FIG. 1, an example of the fiber bundle 2 in a fiber-spread state (reinforcing fibers 2A have been thinly arranged in the width direction) is shown by a diagrammatic perspective view. For this reason, the cross-sectional shape of the fiber bundle 2 viewed from the cross section of the composite material 1 is recognized as a rectangle, when taken as a whole. However, the cross-sectional shape of the fiber bundle 2 is not particularly limited and, for example, may be a circle or a rectangle.

(Thermoplastic Resin Emulsion)

The thermoplastic resin component derived from the thermoplastic resin emulsion contained in the thermoplastic composite material of the present invention is described below. This component is a component obtained from the following thermoplastic resin emulsion, by a heating step described below.

The thermoplastic resin emulsion (hereinafter may be also referred to as the emulsion) used in the present invention is in a state in which fine particles composed of a water-insoluble thermoplastic resin have been stably dispersed in a dispersion medium. In other words, the emulsion used in the present invention is in a form in which an aqueous phase (dispersion medium) acts as a continuous phase and thermoplastic resin fine particles act as a dispersion phase. By impregnating this emulsion to a fiber bundle and then subjecting the fiber bundle to a heating step described below, the dispersion medium in the emulsion is evaporated, whereby a thermoplastic composite material composed of the fiber bundle and the thermoplastic resin can be obtained.

The thermoplastic resin emulsion used in the present invention is not restricted in particular, as long as the emulsion contains a dispersion medium and a thermoplastic resin.

The average particle size of the above-described fine particles is preferably from 50 to 500 nm, and more preferably from 100 to 300 nm. The average particle size can be measured by dispersing fine particles in an alcohol or water and by using an optical particle size analyzer such as laser diffraction particle size analyzer.

The emulsion preferably contains a basic substance. The emulsion also may contain a high molecular dispersant, an emulsifier and the like.

Further, in the production process of the thermoplastic composite material and its formed body, the emulsion may contain, as an additive, a substance that can be removed from these materials by heat. It is preferable that the additives have been removed as much as possible from the finished formed body.

One of preferable embodiments of the above-described thermoplastic resin emulsion is a polypropylene emulsion.

<Thermoplastic Resin>

Examples of the above-described thermoplastic resins include a vinyl acetate resin, an ethylene vinyl acetate copolymer resin, an ethylene-vinyl acetate-acrylic acid ester resin, an acrylic acid ester resin, an acrylic acid ester multicomponent copolymer resin, a styrene-acrylic acid ester resin, a styrene-acrylic resin, a polyethylene, a polyethylene wax, a polyethylene-series copolymer resin, a polypropylene, a polypropylene wax, a urethane-modified resin, a vinyl chloride resin, a polyester, a polycarbonate, a cellulose acetate, and the like. Among them, a polypropylene is preferred.

As for the polypropylene, there are kinds of resin such as a random polypropylene, a block polypropylene, a homo polypropylene, and the like. Any of these resins may be used.

The polypropylene preferably has a high molecular weight. In particular, a mass-average molecular weight of 50,000 or more is desirable.

It is preferable that the polypropylene is subjected to graft modification. By graft modification, affinity between the polypropylene and the aqueous medium described below can be increased.

<Dispersion Medium>

As a dispersion medium, water or an aqueous medium (hereinafter, these are collectively called as "an aqueous medium") is used. The aqueous medium may contain a dissolving component in an amount such that advantages of the present invention are not undermined.

In the suspension method described in the Patent Literature 4, an organic solvent may be sometimes evaporated at the time of heating and drying of the suspension, or in an electrifying process for increasing an efficiency of the suspension to be adhered to a reinforcing fiber or for increasing uniformity of the adhesion amount. In contrast, because an aqueous medium is used as a dispersion medium in the present invention, it is possible to keep a lid on cost for maintenance and sustainment of the environment of worker safety.

Further, in order to improve affinity between the aqueous medium and the thermoplastic resin (for example, polypropylene), the dispersion medium may contain a small amount of a hydrophilic organic solvent. There is a concern that if a hydrophilic organic solvent is present in the dispersion medium, the dispersion medium may interrupt a bond of the reinforcing fiber and the resin, and therefore the smaller addition amount of the hydrophilic organic solvent is preferred.

(Basic Material)

In the preparation of the emulsion, the use of a basic substance is preferable for acceleration of emulsification or neutralization. Examples of the basic substance include sodium hydroxide, potassium hydroxide, sodium hydrogen carbonate, amines such as ammonia and organic amine compounds, and the like. Examples of the organic amine compounds include triethyl amine, N,N-dimethylethanol amine, isopropyl amine, iminobispropyl amine, ethyl amine, diethyl amine, 3-ethoxypropyl amine, 3-diethylaminopropyl amine, sec-butyl amine, propyl amine, methylaminopropyl amine, methyliminobispropyl amine, 3-methoxypropyl amine, monoethanol amine, morpholine, N-methyl morpholine, N-ethyl morpholine, and the like. These may be used in mixture. As the basic substance, sodium hydroxide, potassium hydroxide and an organic amine compounds are more preferred. Particularly preferred are potassium hydroxide, triethyl amine and N,N-dimethylethanol amine.
(High Molecular Dispersant)

As the high molecular dispersant, a high molecular dispersant that has a high affinity for an aqueous medium is preferred. Such high molecular dispersant includes a surfactant, for example, polymers of alkylene oxides represented by polyethylene oxide and polyethylene glycol; and esters of styrene-maleic anhydride copolymers and/or styrene-maleic acid copolymers. Only 1 kind of these polymers may be used, or 2 or more kinds thereof may be used, or alternatively these may not be contained.
(Emulsifier)

Examples of the emulsifier include an aliphatic acid, a nonionic surfactant, an anionic surfactant, and a cationic surfactant (however, the above-described basic substance is removed therefrom). Only 1 kind of these compounds may be used, or 2 or more kinds thereof may be used, or alternatively these may not be contained. Further, if the emulsifier is present in the emulsion, the strength or the elastic modulus may be sometimes lowered when formed as a formed body, and therefore it is sometimes preferable that the emulsifier is not contained in the emulsion.
<Preparation Method of Thermoplastic Resin Emulsion>

The thermoplastic resin emulsion used in the present invention can be prepared using a known method. For example, as described in Japanese Patent Nos. 3401088 and 4594231, the thermoplastic resin emulsion can be prepared by adding a high molecular dispersant, an emulsifier, an aqueous medium, and the like to a thermoplastic resin, and heating while stirring, and then cooling.

The content of the thermoplastic resin in 100% by mass of the thermoplastic resin emulsion is preferably from 5 to 50% by mass, more preferably from 10 to 40% by mass, and particularly preferably from 20 to 35% by mass. If the content of the thermoplastic resin is from 5 to 50% by mass, the impregnation efficiency of the thermoplastic resin into an interspace between reinforcing fibers can be improved, whereby an amount of the thermoplastic resin to be adhered to the reinforcing fibers can be controlled to a preferred amount.

As the heating temperature, a range of a melting point of the resin $T_m$ to $[T_m+80°$ C.] is preferable, and a range of a melting point of the resin $T_m$ to $[T_m+50°$ C.] is more preferable.
(Characteristics of Thermoplastic Composite Material)
<Analysis Method of Emulsion>

The use of the emulsion, as described above, results in that additives such as the high molecular dispersant, the emulsifier, the basic substance, and the like are contained in the composite material. Therefore, the use of the emulsion when producing the thermoplastic composite material results in that the composite material includes components derived from the thermoplastic resin, the high molecular dispersant, the emulsifier, and/or the basic substance, each of which is contained in the emulsion as a resin component (herein, the resin component means components other than the reinforcing fiber). In other words, in the case where, in addition to the thermoplastic resin, components derived from the high molecular dispersant, the emulsifier, the basic substance, or the like were confirmed by analysis of the resin component in the formed body or the composite material, one can judge that the thermoplastic resin emulsion was used. Hereinafter, specific analysis methods are described. However, the method for making a judgement on whether a thermoplastic resin emulsion has been used in the formed body or the composite material is not limited to the following analysis methods.

Analysis Method 1

A formed body or a composite material tape is cut out at the vertical cross-section of the fiber and the cut-out material is buried within an epoxy resin and then is polished. After that, a surface polish is performed by the ion milling. The resultant cross-section is subjected to an elemental mapping by means of EPMA (Electron Probe MicroAnalyser) (JXA-8230, manufactured by JEOL Ltd.). By the elemental mapping, K derived from potassium hydroxide (KOH) or the like, or Na derived from sodium hydroxide (NaOH) or the like, each of which is used for pH adjustment of the emulsion, can be detected from a resin portion around the fiber.

Analysis Method 2

A formed body or a composite material tape is cut out at the vertical cross-section of the fiber. A volatile element of the cut-out material, when heated at 300° C. for 10 minutes, is analyzed by means of GC-MS (Gas Chromatography-Mass Spectrometry) (JMS-Q1050GC, manufactured by JEOL Ltd.). By the analysis, ammonia or organic amine compounds (for example, dimethylamino ethanol) used as a dispersion stabilizer for the emulsion can be detected.

The thermoplastic composite material preferably contains at least one or more of Na, K, ammonia and organic amine compounds, each of which is derived from the above-described basic substance.
<Amount of Surfactant in Thermoplastic Composite Material>

It is preferable that the thermoplastic composite material does not contain any of the above described surfactant. Examples of the surfactant include those recited as examples of the high molecular dispersant and the emulsifier described above. Herein, the expression "does not contain" means that the content of the surfactant in 100% by mass of the thermoplastic composite material is 0.5% by mass or less. The content of the surfactant can be measured by a common mass spectrometry, for example, a nuclear magnetic resonance (NMR) method, or a gas chromatograph mass spectrometry (GC-MS) method, or can be calculated from the content of the thermoplastic resin in the emulsion before impregnation.

The content of the surfactant in the thermoplastic composite material can be controlled to the above-described range by adjusting (reducing) the content of the surfactant in the emulsion, or by heating the thermoplastic composite material in the preparation thereof.
<Bending Strength, Bending Elastic Modulus, and Variation Coefficient of Bending Strength of the Thermoplastic Composite Material>

Referring to a bending strength, a bending elastic modulus, and a variation coefficient of the bending strength of the laminated body in which a plurality of layers of the thermoplastic composite material of the present invention has been laminated so that the reinforcing fibers of the thermoplastic composite material would be aligned to one direction, when bent in the fiber-axis direction and measured in conformity to JIS K7074, the bending strength is 250 MPa or more, the bending elastic module is 90 GPa or more, and the variation coefficient of the bending strength, when measured at N=5 or more, is 7% or less.

The bending strength, the bending elastic modulus, and the variation coefficient of the bending strength can be measured by methods described in Examples described below.

Due to the bending strength of 250 MPa or more and the bending elastic module of 90 GPa or more, the formed body achieves excellent strength and stiffness, whereby the formed body does not easily get broken even in the intended use to need the strength, and is excellent in reliability. In particular, even when the formed body has increased in size, a deflection due to one's own weight becomes hard to occur, whereby a formed body having an excellent strength can be provided. If the bending strength becomes less than 250 MPa, a formed body, in a case of a large size and thin-walled one, sometimes may get broken due to one's own weight. Further, the bending strength is preferably 1500 MPa or less, although the bending strength is not limited thereto. In order to prepare a formed body of the strength exceeding 1500 MPa, it is necessary to increase a fiber volume fraction in the composite material to the limit and also to lower a void content of the composite material to the limit. Therefore, such formed body is sometimes inferior in productivity and cost.

Further, a formed body, in a case wherein the bending elastic modulus thereof is less than 90 GPa, may be sometimes inferior in a bending stiffness. In order to make up for the bending stiffness, the increase in the formed body-wall thickness becomes necessary, which sometimes invites gain of weight.

Further, if the above-described variation coefficient of the bending strength becomes large exceeding 7%, variability of the formed body becomes large, whereby a non-uniform formed body is formed, and disruption or the like at a weak portion is associated, when a stress in the processing or the like is applied, which make the formed body less reliable.

Further, the bending elastic modulus is preferably 95 GPa or more.

<Fiber Volume Fraction of the Composite Material>

The fiber volume fraction (Vf) of the composite material is 40% or more and 70% or less in 100% of the thermoplastic composite material. Control of the fiber volume fraction allows impregnation of a thermoplastic resin emulsion and reduction of a void content, whereby a composite material having excellent bending strength or the like can be achieved.

The fiber volume fraction (Vf) can be measured in conformity to JIS K 7075.

In the composite material whose fiber volume fraction is less than 40%, when produced numerously, variation in performance between composite materials sometimes becomes large, and further the thickness of the composite material is easy to become thin, which is inferior in the production cost of the formed body. Further, the variation coefficient of the bending strength, when the formed body described below is formed, sometimes becomes large. On the other hand, when the fiber volume fraction exceeds 70%, it exceeds the limit of the fiber volume fraction at which the reinforcing fiber can be integrated with the thermoplastic resin component, and it tends to be difficult to uniformly combine the reinforcing fiber and the resin, and the void content and the variation coefficient of the bending strength tends to be large. Further, the fiber volume fraction is preferably 45% or more and 65% or less, and more preferably 45% or more and 55% or less.

<Void Content of the Composite Material>

The void content of the composite material can be measured in conformity to JIS K 7075.

The void content of the composite material of the present invention is 3% or less, more preferably 2.5% or less, and further more preferably 2% or less. The void generates mainly due to air pockets contained in the composite material. The void can become a defect in the composite material (can become a breaking point of origin), and therefore when the void content is high, the bending strength is likely to be lower than the ideal state. Further, in view of air contained between the reinforcing fibers or in the resin, it is technically difficult to control the void content to less than 0.5%.

<Thickness and Shape of the Composite Material>

The thickness of the composite material is preferably 0.05 mm or more and 0.5 mm or less, although it depends on a filament size and filament number of the fiber bundle. If the thickness is less than 0.05 mm, the weight per sheet is very light, and therefore the rumpling and crease sometimes occur due to a surrounding wind or the like, whereby handling is difficult and it sometimes becomes hard to obtain a uniform formed body. If the thickness exceeds 0.5 mm, it sometimes becomes hard to control the thickness of the formed body. The thickness of the composite material is preferably 0.1 mm or more and 0.4 mm or less, and more preferably 0.15 mm or more and 0.35 mm or less.

The cross-sectional shape of the composite material with respect to the direction of the fiber axis is not particularly limited, and may be a circle or rectangle.

(Production Method of the Composite Material)

The production method of the composite materials is not particularly limited and, for example, the following method may be used.

The method includes:

a step (step 1) of soaking a fiber bundle, in which a plurality of reinforcing fibers has been lined up in a predetermined direction, in a thermoplastic resin emulsion; and a step (step 2) of heating the fiber bundle after soaking at the temperature of a boiling point of the dispersion medium or higher and a melting point of the thermoplastic resin+80° C. or less.

By performing the step 1, the fiber bundle is soaked in the thermoplastic resin emulsion, thereby impregnating the emulsion into the fiber bundle. In the case where polypropylene is used as a thermoplastic resin, since the polypropylene is lighter than water because its specific gravity is 0.9, when the polypropylene is suspended, it is considered to be very difficult to maintain a uniform dispersion state in an aqueous medium for a long time. In contrast, when the polypropylene is emulsified, it is believed that a uniform dispersion state can be achieved stably, whereby the polypropylene can be impregnated into the fiber bundle.

By performing the step 2, an aqueous medium which is a dispersion medium contained in the thermoplastic resin emulsion is volatilized to dry.

In the step 1, by using a plurality of fiber bundles, a wide range of composite materials may be also obtained.

In the step 1, the fiber bundle may be spread or may not be spread, but it is preferable that the fiber bundle is not spread.

In the step 1, the soaking time is preferably from 1 to 5 minutes. The step 1 may contain a squeezing step for adjusting an amount of the thermoplastic resin to be contained in the fiber bundle.

In the step 1, the thermoplastic resin emulsion is preferably impregnated so that the amount of the thermoplastic resin after the above-described impregnation or the above-described adjustment is 60 to 140 g with respect to 100 g of the fiber bundle.

Examples of the drying means in the step 2 include a circulating hot air thermostatic oven, a heating furnace, a vacuum dryer, a pressing machine, a heating roller, and the like. In order to prevent the rumpling of the fiber itself, it is preferred to use a Labo-Press which is able to adjust a force applied to the fiber.

Further, the drying temperature is preferably set to a temperature of 100° C. or higher that is equal to or higher than the boiling point of water and a temperature that is, at a maximum, higher by 80° C. than a melting point $T_m$ of the resin contained in the emulsion. In a case of drying at lower than 100° C., it takes a time for evaporation of water, whereby the production cost sometimes increases. Further, In a case of drying at a temperature that is higher than [a melting point $T_m+80°$ C.], reduction of molecular weight due to deterioration (decomposition) of the resin contained in the emulsion occurs, whereby the strength of the formed body sometimes becomes insufficient, or uniformity of the product strength sometimes becomes insufficient due to increase in variation coefficient of the bending strength. Further, the drying temperature is more preferably a melting point $T_m$ of the resin or higher and it is preferable that the resin is at least partially fused.

The melting point $T_m$ of the resin contained in the emulsion can be determined by a differential scanning calorimetry from the residue remained after drying the emulsion, although the measurement is not limited to this. More specifically, the melting point can be measured by the method described in Example described below.

In the composite material obtained by the step 2, the content of the thermoplastic resin is preferably from 10 to 40% by mass.

In the present invention, in order to increase an adhesion force between reinforcing fibers and a thermoplastic resin in the emulsion, a sizing agent, an oil, a paste, or the like, each of which is adhered to reinforcing fibers, can be removed before impregnation of the emulsion. Further, if needed, preliminarily the reinforcing fibers may be subjected to a fiber-opening treatment or to a surface treatment with electrolysis or chemicals.

(Intended Use of the Composite Material)

The composite material of the present invention can be applied to the production of a formed article (a half-finished product and a product or a member thereof are included) which requires strength and lightweight properties or the like.

Examples of the product that requires the above-mentioned properties include an aerospace field, automobiles, sporting goods, and personal computer housing.

[Formed Body]

The formed body of the present invention means an integrated laminate designed so as to have a desired thickness through a process of piling plural sheets of the composite material on each other and then subjecting them to a heat press or the like.

Examples of the shape of the formed body include a tray shape, a cylindrical shape, and the like, although the shape varies depending on a member or the like, and is not limited to these. It is also possible to form a complicated 3-dimentional structure including concavity and convexity such as a rib, in conformity to the shape of the desired member.

Although the forming method is not limited to the following, a heat press forming can be performed to be a desired shape, by appropriately laminating and arranging composite materials in a hollow spacer or between male-female dies, and then by subjecting them to a compression forming after pre-warming at a predetermined temperature.

For the preparation of the formed body, it is also possible to adopt common methods other than the heat press forming, such as a tape placement method, and among others, an autoclave method used for forming of the carbon fiber, and a filament winding method, and common forming methods such as a vacuum forming and a match mold forming each of which is involved in the forming of the thermoplastic resin.

When the composite material prepared by the above-described method is processed to a formed body, the composite material may be processed to a formed body in which fiber materials have been lined up in one direction in the sheet form, a formed body in which these have been laminated orthogonally, a formed body in which the composite materials have been processed to a textile such as a plane-woven fabric and a twill, a cloth such as a non-woven fabric, or a formed body in which the composite materials have been processed to a strand-shaped material such as a braid.

When the composite materials are formed by lamination, the formed body sometimes becomes relatively higher in terms of fiber volume fraction than the composite materials due to overflow of the resin content.

In the preparation of the formed body, in order to reinforce the portion at which strength or stiffness is needed in particular, or to adjust a cost or a fiber volume fraction of the formed body, a thermoplastic resin film may be laminated at the time of forming. For example, in a case of obtaining a formed body using a polypropylene emulsion, a polypropylene film such as a commercially available PP film may be laminated at the time of forming. Examples of the PP film to be laminated include an OPP (oriented polypropylene) film, CPP (cast polypropylene) film, and the like.

The formed body of the present invention is used in the above-described intended use, and its shape or structure and the like are not particularly limited, and are appropriately set in accordance with an intended use.

EXAMPLES

The present invention will be described in more detail based on examples given below, but the invention is not meant to be limited by these.

[Evaluation and Measurement Methods]
(1) Thickness of Composite Material and Formed Body The thickness of each of the composite material and the formed body cut out in the size of 15 mm×100 mm was measured at the 5 points in the longitudinal direction thereof using a micrometer. An average of 5-point thicknesses was defined as a thickness of each of the composite material and the formed body.

(2) Bending Strength, Bending Elastic Modulus, Deviation Coefficient of Bending Strength The formed body prepared by laminating the thermoplastic composite material described below and subjecting the laminate to a heat compression forming as described below was cut out in the size of 15 mm×100 mm. The obtained specimen was subjected to a conditioning for 24 hours under the condition of 60% RH. After that, a 3-point bending test was conducted at 23° C. using INSTRON 5567 (manufactured by Instron Japan Company Limited). Supports were set in the vicinity of the ends in the fiber axis direction of the specimen, the distance between the supports was set to 80 mm, and the bending speed was set to 5 mm/min. Therein, from readout of a load at the point of the maximum load, the bending strength was measured in conformity to JIS K7074. Based on the results from the measurement of the bending strength at N=5 or more, the deviation coefficient was calculated in conformity to JIS K7074. Further, from a linear gradient of the bending curve, the bending elastic modulus was measured in conformity to JIS K7074.

(3) Void Content, Fiber Volume Fraction

The void content and the fiber volume fraction (Vf) of the obtained composite material and formed body were measured according to the combustion method described in JIS K7074 (A test method for fiber content and void content of a carbon fiber-reinforced plastic).

(4) Melting Point of the Resin Contained in the Emulsion

As to the melting point of the resin contained in the emulsion, the emulsion was left to stand in atmosphere for one night or longer in a draft controlled at 23° C., and then moisture was volatilized by air seasoning to obtain a residue. From 5 to 10 mg of the obtained residue was put into an aluminum pan and then was subjected to a differential scanning calorimetry (DSC-60, manufactured by Shimadzu Corporation). As a 1st RUN, the temperature rise was performed up to 200° C. and then the temperature was maintained for 5 min.; after that, the temperature was rapidly cooled to 40° C. Further, as a 2nd RUN, the temperature rise was performed up to 200° C. at the rate of 10° C./min starting from 40° C. A peak temperature of the endothermic peak was defined as a melting point $T_m$. In a case where a plurality of the endothermic peaks is seen in the temperature range of 40° C. to 200° C., a peak temperature at the higher temperature side was defined as a melting point $T_m$.

Example 1

(Preparation of Thermoplastic Composite Material)

A continuous carbon fiber bundle (trade name: TRH50 60M, manufactured by Mitsubishi Rayon Co., Ltd., filament number contained in the fiber bundle: 60,000, width 10 mm, a plurality of reinforcing fibers has been lined up in a predetermined direction (one direction)) was soaked for 1 min. in a metal vat filled with a modified PP emulsion. As the modified PP emulsion, MGP-1650 (manufactured by Maruyoshi Chemical Co., Ltd., $T_m$=139° C., maleic acid anhydride-modified PP emulsion, PP content: 30% by mass, average particle size: 250 nm) was used. Solids obtained after vaporization of a solvent for the MGP-1650 was analyzed using EPMA. As a result, K was detected. From this result, it was found that KOH was used for a pH adjustment.

Next, the continuous carbon fiber bundle having the modified PP emulsion impregnated thereto was squeezed to moderately remove an extra modified PP emulsion. After that, the thus obtained fiber bundle was dried by a heat treatment (165° C., 3 min.), and then was cooled, thereby to prepare a tape-like composite material (width: 15 mm, thickness: 0.25 mm, fiber volume fraction Vf: 45%) in which the modified PP emulsion has been impregnated into the spaces between continuous reinforcing fibers. The content of the modified PP emulsion in the obtained composite material was 40% by mass.

(Production Method of Formed Body)

Next, 8 sheets of the tape-like composite materials were prepared, and the composite materials were laminated and configured so that continuous reinforcing fibers of each of the composite materials were arranged in the same direction (parallel direction). This laminate body was put into a mold having the same size as the specimen of JIS K 7074, and after pre-heating for 10 min., a press forming was performed at 180° C. under a pressure of 10 MPa for 5 min. by using a hot press machine (Desktop Hot Press, manufactured by Techno Supply Co., Ltd.), thereby to prepare an about 2 mm-thick formed body having a rectangular shape.

The composite material prepared in Example 1 was analyzed using EPMA. As a result, K was detected from a resin around the fiber. Since K was confirmed to be an element derived from the modified PP emulsion, it was confirmed that the emulsion has been used in the composite material.

The amount of the surfactant, in 100% by mass of the composite material, which was calculated from the content of a surfactant in the modified PP emulsion, was 0.88% by mass (hereinafter, the amount of the surfactant is defined in this way).

Example 2

The tape-like composite materials and the formed body were prepared and evaluated in the same manner as in Example 1, except that the impregnation conditions of the modified PP emulsion were controlled so that the fiber volume fraction of Example 1 would be 60%. According to the evaluation, the results shown in Table 1 were obtained. The amount of the surfactant, in 100% by mass of the composite material, was 2.07% by mass. The amount of the modified PP in the composite material was 12% by mass.

Example 3

The tape-like composite materials and the formed body were prepared and evaluated in the same manner as in Example 1, except that the modified PP emulsion used in Example 1 was changed to the modified PP emulsion containing a polypropylene having $T_m$=147° C. According to the evaluation, the results shown in Table 1 were obtained. The formed body was also analyzed using EPMA. As a result, K was detected from a resin around the fiber. Since K was confirmed to be an element derived from the modified PP emulsion, it was confirmed that the emulsion has been used in the composite material. The amount of the surfactant, in 100% by mass of the composite material, was 0.92% by mass. The amount of the modified PP in the composite material was 32% by mass.

Example 4

The tape-like composite materials and the formed body were prepared and evaluated in the same manner as in Example 1, except that the modified PP emulsion used in Example 1 wash changed to the modified PP emulsion containing no surfactant. According to the evaluation, the results shown in Table 1 were obtained. As the above-described modified PP emulsion containing no surfactant, ARO-BASE DB-4010 (maleic anhydride-modified PP emulsion, manufactured by Unitika Ltd., $T_m$=153° C., PP content: 25% by mass, average particle size: 250 nm) was used. Further, as a result of analysis of the ARO-BASE DB-4010 using a heat decomposition GC-MS, dimethylamino ethanol was detected.

The volatile substances in heating of the obtained composite material at 300° C. for 10 min. were analyzed using the heat decomposition GC-MS. As a result, dimethylamino ethanol was detected. Since dimethylamino ethanol was confirmed to be a content derived from the modified PP emulsion, it was confirmed that the emulsion has been used in the composite material. The amount of the surfactant, in 100% by mass of the composite material, was 0% by mass. The amount of the modified PP in the composite material was 27% by mass.

Example 5

The formed body was prepared in the same manner as in Example 4, except that a tape-like composite material (width: 15 mm, thickness: 0.200 mm) was obtained by adding 3% by mass of the surfactant NONION S-220 (manufactured by NOF Corporation) to the modified PP emulsion in Example 4. According to the evaluation, the results shown in Table 1 were obtained. The formed body was also analyzed using heat decomposition GC-MS. As a result, dimethylamino ethanol was detected. The amount of the surfactant, in 100% by mass of the composite material, was 1.45% by mass. The amount of the modified PP in the composite material was 36% by mass.

Comparative Example 1

The tape-like composite materials and the formed body were prepared and evaluated in the same manner as in Example 1, except that impregnation conditions of the modified PP emulsion were controlled so that the fiber volume fraction of Example 1 would be 30%, and also that a resin sheet for the resin shortage were supplied in the production of the formed body. According to the evaluation, the results shown in Table 1 were obtained. The formed body was also analyzed using EPMA. As a result, K was detected from a resin around the fiber. Since K was confirmed to be an element derived from the modified PP emulsion, it was confirmed that the emulsion has been used in the composite material. The amount of the surfactant, in 100% by mass of the composite material, was 0.65% by mass. The amount of the modified PP in the composite material was 60% by mass.

Comparative Example 2

Preparation of the tape-like composite materials was tried in the same manner as in Example 1, except that impregnation conditions of the modified PP emulsion were controlled so that the fiber volume fraction of Example 1 would be 90%. As a result, unification was found to be difficult because of high fiber volume fraction. Therefore, evaluation was not conducted because it was difficult to prepare a homogeneous specimen in appearance.

Comparative Example 3

In the same manner as in Example 1, the tape-like composite materials (width: 15 mm, thickness: 0.200 mm) was prepared, and a formed body was prepared, except that the modified PP emulsion was changed to a polyethylene emulsion (PE emulsion) containing a polyethylene of $T_m$=105° C. According to the evaluation, the results shown in Table 1 were obtained. The formed body was also analyzed using EPMA. As a result, K was detected from a resin around the fiber. Since K was confirmed to be an element derived from the modified PE emulsion, it was confirmed that the emulsion has been used in the composite material. The amount of the surfactant, in 100% by mass of the composite material, was 0.75% by mass. The amount of the modified PE in the composite material was 32% by mass.

Comparative Example 4

A 0.25 mm-thick composite material was obtained by laminating a carbon fiber (trade name: TRH 50 60M, manufactured by Mitsubishi Rayon Co., Ltd., filament number in the fiber bundle: 60,000, width 10 mm, a plurality of reinforcing fibers has been lined up in a predetermined direction (one direction)) and an OPP film (trade name: ALphan PY-001, manufactured by Oji F-Tex Co., Ltd., $T_m$=167° C.) in a metallic mold while adjusting so that the fiber volume fraction would be 50%, and then pressing the laminate under the pressure of 10 MPa for 6 minutes in a press machine (Desktop Hot Press, manufactured by Techno Supply Co., Ltd.) conditioned at 180° C. 8 sheets of the prepared composite material were laminated so that continuous reinforcing fibers of each of the composite materials would be arranged in the same direction (parallel direction). After pre-heating for 10 min., a hot press was conducted at 180° C. under the pressure of 10 MPa for 5 min., thereby to prepare an about 2 mm-thick formed body.

The composite material prepared in Comparative Example 4 was analyzed using EPMA. As a result, none of K, Na, and organic amines was observed from the resin around the fiber. Therefore, it was confirmed that the composite material of Comparative Example 4 did not use any emulsion. The amount of the surfactant, in 100% by mass of the composite material, was 0% by mass. The amount of the modified PP in the composite material was 32% by mass.

Comparative Example 5

A formed body was prepared in the same manner as in Comparative Example 4, except that the OPP film of Comparative Example 4 was changed to a 100 μm-film obtained by subjecting a maleic acid-modified PP resin (trade name: Fusabond P353, manufactured by DuPont Corporation, $T_m$=143° C.) to a hot press forming at 200° C. and 10 MPa. According to the evaluation, the results shown in Table 1 were obtained. The formed body was also analyzed using EPMA. As a result, none of K, Na, and organic amines was observed from the resin around the fiber. Therefore, it was confirmed that the composite material did not use any emulsion. The amount of the surfactant, in 100% by mass of the composite material, was 0% by mass. The amount of the modified PP in the composite material was 32% by mass.

Comparative Example 6

The tape-like composite materials and the formed body were prepared and evaluated in the same manner as in Example 1, except that the modified PP emulsion used in Example 1 was diluted tenfold with purified water. According to the evaluation, the results shown in Table 1 were obtained. The formed body was also analyzed using EPMA. As a result, K was detected from a resin around the fiber. Since K was confirmed to be an element derived from the modified PP emulsion, it was confirmed that the emulsion has been used in the composite material. The amount of the surfactant, in 100% by mass of the composite material, was 0.09% by mass. The amount of the modified PP in the composite material was 28% by mass.

TABLE 1

|  | Ex. 1 | Ex. 2 | Ex. 3 | Ex. 4 | Ex. 5 | Comp. 1 | Comp. 2 | Comp. 3 | Comp. 4 | Comp. 5 | Comp. 6 |
|---|---|---|---|---|---|---|---|---|---|---|---|
| Used resin | PP | PP | PP | PP | PP | PP | PP | PE | PP | PP | PP |
| Melting point of resin [° C.] | 139 | 139 | 147 | 153 | 153 | 139 | 139 | 105 | 167 | 143 | 139 |
| Subjection to graft modification | Yes | Yes | Yes | Yes | Yes | Yes | Yes | Yes | No | Yes | Yes |
| Heat treatment temperature of fiber bundle [° C.] | 165 | 165 | 165 | 165 | 165 | 165 | 165 | 165 | 165 | 165 | 165 |
| Thickness of composite material [mm] | 0.25 | 0.25 | 0.25 | 0.25 | 0.25 | 0.25 | — | 0.2 | 0.25 | 0.25 | 0.25 |
| Amount of fiber in composite material [%] | 45 | 61 | 48 | 47 | 45 | 30 | 90 | 48 | 56 | 47 | 50 |
| Thickness of formed body [mm] | 1.84 | 1.92 | 1.99 | 1.77 | 1.67 | 1.73 | — | 1.72 | 1.95 | 1.70 | 1.32 |
| Forming temperature of formed body [° C.] | 180 | 180 | 180 | 180 | 180 | 180 | — | 180 | 180 | 180 | 180 |
| Fiber content in formed body [%] | 50 | 65 | 50 | 54 | 47 | 30 | — | 50 | 50 | 50 | 53 |
| Void content of formed body [%] | 1.3 | 1.8 | 1.4 | 1.4 | 2.8 | 3 | — | 4.4 | 4.4 | 6 | 7.9 |
| Bending strength [MPa] | 430 | 348 | 312 | 998 | 610 | 249 | — | 230 | 170 | 514 | 349 |
| Deviation coefficient of bending strength [%] | 1.3 | 4.3 | 3.2 | 6.5 | 6.9 | 5.6 | — | 2.7 | 5.4 | 8.9 | 10.4 |
| Bending elastic modulus [GPa] | 98 | 120 | 93 | 115 | 105 | 49 | — | 84 | 80 | 108 | 86 |

Notes
1: Examples 1 to 5 are respectively abbreviated as "Ex. 1" to "Ex. 5" and Comparative Examples 1 to 6 are respectively abbreviated as "Comp. 1" to "Comp. 6."
2: Polypropylene is abbreviated as "PP" and polyethylene is abbreviated as "PE".

In Examples 1 to 5 and Comparative Examples 1 to 6, the void content of the composite material and the void content of the molted body were substantially equal to each other.

The results of Table 1 show that the use of the PP emulsion allows provision of a formed body having a high strength and an excellent uniformity in strength (comparison between Examples 1 to 5 and Comparative Example 3, and Comparative Examples 4 and 5).

In the formed bodies of Examples 1 to 5 each of which satisfies the conditions specified in the present invention, the bending strength and the bending elastic modulus were excellent, and the coefficient of variation of the bending strength was small. Composite materials and their formed body each were excellent in uniformity of strength.

In a case where the fiber volume fraction (Vf) of the composite material was small, the bending strength and bending elastic modulus of the composite material were inferior, whereby the variation coefficient of the bending strength was increased (Comparative Example 1). Further, in a case where the value of Vf was too large, it was difficult to unite the reinforcing fiber and the resin as a composite material (Comparative Example 2).

Further, in a case where the void content of the composite material (a void content of the formed body is shown in Table) was high, the bending strength and bending elastic modulus of the composite material were inferior (Comparative Example 3).

Further, in a case where the OPP film or the acid-modified PP film was used without the emulsion as a resin to be united with a reinforcing fiber, the bending strength and bending elastic modulus were inferior, or the variation coefficient increased, whereby uniformity in strength of the formed body was inferior (Comparative Examples 4 and 5).

Further, in a case where the amount of polypropylene to be coated to the fiber was decreased by diluting an emulsion and the polypropylene was used in the same way as a common sizing agent, the bending elastic modulus was inferior, and the void content and the variation coefficient increased, whereby uniformity in strength of the formed body was inferior (Comparative Example 6).

Having described our invention as related to the present embodiments, it is our intention that the invention not be limited by any of the details of the description, unless otherwise specified, but rather be construed broadly within its spirit and scope as set out in the accompanying claims.

REFERENCE SIGNS LIST

1 Thermoplastic composite material
2 Fiber bundle
2A Reinforcing fibers
3 Polypropylene components

The invention claimed is:

1. A thermoplastic composite material comprising, a fiber bundle having a polypropylene emulsion impregnated therein and having a plurality of reinforcing fibers lined up in a predetermined direction,
   wherein the thermoplastic composite material satisfies the following conditions (1) to (4):
(1) A void content of the thermoplastic composite material is 3% or less,
(2) A fiber volume fraction of the thermoplastic composite material is 45% or more to 65% or less,
(3) A bending strength of a laminated body, in which a plurality of layers of the thermoplastic composite material has been laminated so that the reinforcing fibers would be lined up in one direction, when bent in the fiber-axis direction and measured in conformity to JIS K7074, is 250 MPa or more, and a bending elastic modulus of the laminated body is 90 GPa or more, and
(4) A variation coefficient of the bending strength, when measured at N=5 or more and calculated in conformity to JIS K7074, is within 7%.

2. The thermoplastic composite material as described in claim 1, wherein the reinforcing fiber comprises a carbon fiber.

3. The thermoplastic composite material as described in claim 1, wherein the polypropylene is graft-modified.

4. The thermoplastic composite material as described in claim 1, wherein the thermoplastic composite material comprises at least one or more selected from the group consisting of Na, K, ammonia, and an organic amine compound.

5. The thermoplastic composite material as described in claim 1, wherein the thermoplastic composite material does not contain any surfactant.

6. A formed body of the thermoplastic composite material as described in claim 1.

7. A thermoplastic composite material comprising a fiber bundle having a plurality of reinforcing fibers lined up in a predetermined direction, and polypropylene, wherein the thermoplastic composite material satisfies the following conditions (1) to (5):

(1) A void content of the thermoplastic composite material is 3% or less, (2) A fiber volume fraction of the thermoplastic composite material is 45% or more and 65% or less, (3) A bending strength of a laminated body, in which a plurality of layers of the thermoplastic composite material has been laminated so that the reinforcing fibers would be lined up in one direction, when bent in the fiber-axis direction and measured in conformity to JIS K7074, is 250 MPa or more and a bending elastic module of the laminated body is 90 GPa or more, (4) A variation coefficient of the bending strength, when measured at N=5 or more and calculated in conformity to JIS K7074, is within 7%, and (5) The thermoplastic composite material further comprises at least one or more selected from the group consisting of Na, K, ammonia, and an organic amine compound.

8. The thermoplastic composite material as described in claim 7, wherein the reinforcing fiber comprises a carbon fiber.

9. A formed body of the thermoplastic composite material as described in claim 7.

10. The thermoplastic composite material as described in claim 1, wherein the fiber volume fraction of the thermoplastic composite material is 45% or more to 55% or less.

11. The thermoplastic composite material as described in claim 1, wherein the thickness of the thermoplastic composite material is 0.05 mm or more and 0.5 mm or less.

12. The thermoplastic composite material as described in claim 7, wherein the fiber volume fraction of the thermoplastic composite material is 45% or more to 55% or less.

13. The thermoplastic composite material as described in claim 7, wherein the thickness of the thermoplastic composite material is 0.05 mm or more and 0.5 mm or less.

* * * * *